Patented Mar. 26, 1946

2,397,287

UNITED STATES PATENT OFFICE 2,397,287

METHACRYLIC ESTERS AND COPOLYMERS THEREOF

Bertil E. Ostberg, Arlington, Mass., assignor to Polaroid Corporation, Cambridge, Mass., a corporation of Delaware No Drawing. Application September 23, 1943, Serial No. 503,531

1 Claim. (Cl. 260—462)

This invention relates to synthetic resins and plastics and, more particularly, to new and improved resins comprising triethoxy silicol methacrylate.

One object of the invention is to provide such a resin which is useful in the formation of hard, transparent, optical elements possessing a relatively high reciprocal dispersion or nu value.

A further object is to provide a copolymer formed from triethoxy silicol methacrylate and other polymerizable unsaturated methylene compounds.

Other objects of the invention will in part be obvious and will in part appear hereinafter.

There is a pressing demand for a synthetic resin composition which may be used in the formation of optical elements such, for example, as lenses, prisms, and the like and which may preferably be cast or molded to the desired form. A preferred resin is one which may be cast into the desired form by, for example, polymerizing the monomer in a suitable mold or by advancing the polymerization of the partially polymerized material in a suitable mold. This invention contemplates the provision of new synthetic resins or plastics which are particularly useful in the production of products of the character described. More specifically, this invention contemplates the provision of synthetic resins which, when polymerized, give a transparent, substantially colorless product having a relatively high index of dispersion or nu value and which is suitable for use in the production of optical elements of the character described.

The compositions of the present invention comprise triethoxy silicol methracrylate and copolymers thereof with other unsaturated methylene compounds.

The novel composition of the present invention may be produced in the following manner: A mixture of 153.5 gms. of ethyl silicate and 63.5 gms. of methacrylic acid is reacted, preferably by heating said mixture in a distilling flask at atmospheric pressure, pyrogallic acid being added to the mixture to inhibit polymerization of the product. Ethyl alcohol is distilled off during the reaction and when the calculated amount of distillate is obtained the pressure in the flask is lowered, for example to 1 mm., and the remaining liquid in the flask is subjected to further distillation at this reduced pressure to obtain the monomeric triethoxy silicol methacrylate. The monomer has an index of refraction ($N_D^{25}$) of 1.4048 and a reciprocal dispersion, i. e., nu value, of 50 and may be readily polymerized by being subjected to heat and/or chemical catalysis and/or actinic light, benzoyl peroxide being a preferred catalyst.

The polymeric triethoxy silicol methacrylate has an index of refraction ($N_D^{20}$) of 1.436 and a reciprocal dispersion, i. e., nu value, of 55. It is a clear, colorless resin which is relatively soft but which may be readily hardened by copolymerization, as hereinafter described.

Under certain conditions, it may be preferable to provide a copolymer which has as one of its constituents triethoxy silicol methacrylate and, as another constituent a plastic which will suitably modify the properties of the resulting copolymer. In this connection it should be noted that triethoxy silicol methacrylate may satisfactorily be copolymerized with virtually all the polymerizable unsaturated methylene compounds to produce products having diverse and varied physical and optical properties. Suitable compounds for use in forming copolymers of the type described are methyl methacrylate, ethyl methacrylate, isopropyl methacrylate, ter-butyl methacrylate, cyclohexyl methacrylate and other esters of alpha-methacrylic acid; the vinyl esters such as vinyl formate, vinyl acetate, vinyl proprionate and the vinyl ester of chloracetic acid, etc.; the vinyl ketones such as methyl vinyl ketone; styrene; vinyl naphthalene; and furylethylene (vinyl furan). Other suitable materials for use in the formation of copolymers falling within the scope of this invention are the esters of itaconic acid and the esters of methylene malonic acid.

It is to be understood that the list of substances given is not all-inclusive although it is believed that the materials mentioned constitute the preferred substances for use in the present invention.

It is also to be understood that, if desired, hardening agents may be employed in small or substantial percentages. Any of a vast number of suitable hardening agents may be used. A preferred hardening agent for use with copolymers comprising methyl methacrylate is either methacrylic acid or acrylic acid, although other known hardening agents such as methacrylic anhydride or allyl methacrylate may be used successfully.

While a preferred product is one which is transparent and which may be molded during polymerization into a suitable optical element, it is to be understood that products which are translucent or even opaque and hence useless in the formation of optical elements may be satisfactorily employed for other purposes where readily moldable, polymerized plastics are desirable, and such products comprising triethoxy silicol methacrylate are to be deemed to fall within the scope of this invention.

Polymerization of the products of the invention may be accomplished preferably by heating mixtures of monomers or the slightly polymerized materials at relatively low temperatures until a solidified product is obtained, when polymerization may be carried forward to a desired point at substantially increased temperatures. Higher temperatures of polymerization generally increase the brittleness of the product. It is, of course, to be understood that where molded optical elements are to be produced, the surfaces of the mold should be optically smooth as the molded product will have substantially the surface properties of the mold.

Since certain changes may be made in the above product and different embodiments of the invention could be made without departing from the scope thereof, it is intended that all matter contained in the above description shall be interpreted as illustrative and not in a limiting sense.

It is also to be understood that the following claim is intended to cover all the generic and specific features of the invention herein described, and all statements of the scope of the invention which, as a matter of language, might be said to fall therebetween.

What is claimed is:

As a new composition, triethoxy silicol methacrylate.

BERTIL E. OSTBERG.